(12) United States Patent
Chen et al.

(10) Patent No.: US 8,230,098 B2
(45) Date of Patent: Jul. 24, 2012

(54) SYSTEM AND METHOD FOR STREAMING MEDIA OBJECTS

(75) Inventors: Songqing Chen, Fairfax, VA (US); Lei Guo, Columbus, OH (US); Zhen Xiao, White Plains, NY (US); Xiaodong Zhang, Williamsburg, VA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 533 days.

(21) Appl. No.: 11/431,681

(22) Filed: May 10, 2006

(65) Prior Publication Data

US 2007/0266169 A1   Nov. 15, 2007

(51) Int. Cl.
*G06F 15/16* (2006.01)

(52) U.S. Cl. ........ 709/231; 709/201; 709/202; 709/203; 709/204; 709/205; 709/206; 709/225; 709/226; 709/227; 709/228; 709/229; 709/230; 709/232; 709/233; 370/389; 370/390; 370/392

(58) Field of Classification Search .................. 370/389, 370/390, 392; 709/225–233, 238, 20–206
See application file for complete search history.

(56) References Cited

U.S. PATENT DOCUMENTS

| | | | | |
|---|---|---|---|---|
| 6,611,872 | B1 * | 8/2003 | McCanne | 709/238 |
| 6,999,988 | B2 * | 2/2006 | Buddhikot et al. | 709/203 |
| 7,133,905 | B2 * | 11/2006 | Dilley et al. | 709/219 |
| 7,277,946 | B2 * | 10/2007 | Humphrey et al. | 709/226 |
| 7,769,881 | B2 * | 8/2010 | Matsubara et al. | 709/232 |
| 7,852,767 | B2 * | 12/2010 | Twiss | 370/235 |
| 8,001,471 | B2 * | 8/2011 | Shaver et al. | 715/716 |
| 8,005,889 | B1 * | 8/2011 | Issa et al. | 709/201 |
| 8,015,491 | B2 * | 9/2011 | Shaver et al. | 715/719 |
| 2002/0007392 | A1 * | 1/2002 | Buddhikot et al. | 709/203 |
| 2003/0088696 | A1 * | 5/2003 | McCanne | 709/238 |
| 2003/0204602 | A1 * | 10/2003 | Hudson et al. | 709/228 |
| 2003/0233423 | A1 * | 12/2003 | Dilley et al. | 709/214 |
| 2004/0010616 | A1 * | 1/2004 | McCanne | 709/238 |
| 2004/0148434 | A1 * | 7/2004 | Matsubara et al. | 709/246 |
| 2004/0201668 | A1 * | 10/2004 | Matsubara et al. | 348/14.05 |
| 2004/0205219 | A1 * | 10/2004 | Li et al. | 709/231 |
| 2005/0091399 | A1 * | 4/2005 | Candan et al. | 709/238 |
| 2005/0168380 | A1 * | 8/2005 | Xu et al. | 342/126 |

(Continued)

FOREIGN PATENT DOCUMENTS

JP   2004253922 A   *   9/2004

(Continued)

OTHER PUBLICATIONS

Androutsellis-Theotokis et al., "A Survey of Peer-to-Peer Content Distribution Technologies", ACM Computing Surveys, vol. 36, No. 4, Dec. 2004, pp. 335-371.*

(Continued)

*Primary Examiner* — Backhean Tiv

(57) ABSTRACT

A method and system for streaming media objects. A streaming system includes a group of end nodes and at least one core node connected via an overlay network. The end nodes cache segments of media objects and stream the media objects to a client segment by segment. Each end node stores segment indices for locating segments cached on end nodes or a core node in the system. The core node is a dedicated proxy which fetches media objects from a remote media server and streams the media objects to a client when the media objects are unavailable from the end nodes.

14 Claims, 6 Drawing Sheets

U.S. PATENT DOCUMENTS

| | | | |
|---|---|---|---|
| 2005/0198286 A1* | 9/2005 | Xu et al. | 709/225 |
| 2005/0198328 A1* | 9/2005 | Lee et al. | 709/229 |
| 2006/0168012 A1* | 7/2006 | Rose et al. | 709/206 |
| 2006/0168318 A1* | 7/2006 | Twiss | 709/238 |
| 2006/0184688 A1* | 8/2006 | Ganguly et al. | 709/232 |
| 2007/0022174 A1* | 1/2007 | Issa | 709/217 |
| 2007/0204003 A1* | 8/2007 | Abramson | 709/217 |
| 2008/0162655 A1* | 7/2008 | Khedouri et al. | 709/206 |
| 2008/0183840 A1* | 7/2008 | Khedouri et al. | 709/217 |
| 2008/0313265 A1* | 12/2008 | Pounds et al. | 709/202 |

FOREIGN PATENT DOCUMENTS

| | | | |
|---|---|---|---|
| JP | 2005085146 A * | 3/2005 | |
| WO | WO 03/088065 | 10/2003 | 709/219 |

OTHER PUBLICATIONS

Lafore, Robert, Object-Oriented Programming in C++, Fourth Edition, Sams, 2001, p. 40.*

Wikipedia, Proxy Server, p. 1-9.*

PCT International Search Report corresponding to PCT Patent Application PCT/US2007/010756 filed May 3, 2007 (3 pages).

PCT Written Opinion of the International Searching Authority corresponding to PCT Patent Application PCT/US2007/010756 filed May 3, 2007 (7 pages).

* cited by examiner

SYSTEM AND METHOD FOR STREAMING MEDIA OBJECTS

BACKGROUND OF THE INVENTION

The present invention is directed to streaming multimedia content over the Internet. More specifically, the present invention is directed to a system and method for streaming media objects using a group of end nodes and at least one core node.

Delivering streaming multimedia content with high quality and low cost over the Internet is challenging due to large sizes of media objects and rigorous requirements of continuous streaming demand. A conventional solution to this problem is a proxy caching approach, which has been utilized for delivering text-based content on the Internet. In a proxy caching approach, a proxy is positioned between web servers and multiple clients to act as a shared cache for the clients. When a client requests a web object, the proxy requests the object from the server, stores (caches) a copy of the object on the proxy, and delivers the object to the client. When there is another request for that web object, by any of the clients, the proxy uses the cached copy of the object instead of requesting it from the server again. Because proxies can serve a large number of clients, a cached object may be served to a large number of clients, while only requiring a single request to the server. This results in reduced latency and network traffic.

However, proxies are limited in the amount of media data they can cache for clients due to the large sizes of media objects and the limited storage capacity of a proxy. Although small media clips can be cached in the same way as caching text-based objects, caching high quality video objects will quickly exhaust the limited storage capacity of a proxy. Thus, when a large number of requests are made for streaming media objects, a proxy can become a system bottleneck and slow down all requests made by all of the clients served by the proxy.

Commercial content delivery networks (CDNs) are systems that can be used for streaming media objects. CDNs have been developed to replicate media servers across the Internet to move media content closer to clients. FIG. 7 illustrates a conventional CDN. In the conventional CDN of FIG. 7, a backbone network 700 connects a media server 702 and a media source 704 with various portals 706, 708, and 710. An access network 730 connects various clients 732, 734, and 736. As illustrated in FIG. 7, client 732 sends a request for media content to a location redirector 720 which redirects the request to portal 706 in the backbone network 700. The content then is distributed in the backbone network from the media server 702 or the media source 704 to one of the portals 706, 708, or 710. The portal 706, 708, or 710 then delivers the content to one of the clients 732, 734, or 736 in the access network 720.

Although CDNs are effective at providing streaming media content, the infrastructure costs of CDNs are great. Thus, small media providers cannot afford the cost of CDN services. Furthermore, large amounts of resources at the clients or end users (e.g., desktop machines, etc.) are underutilized in CDN solutions.

Recently, proxy hierarchies have been developed to provide additional resources to increase efficiency of proxies on the Internet. A proxy hierarchy is a group of proxies which work together for increased performance. In a proxy hierarchy, if a proxy does not have a requested object cached, the proxy can request the object from neighboring proxies. However, coordination of different proxies to deliver high quality streaming media over the Internet remains a challenging problem.

BRIEF SUMMARY OF THE INVENTION

The present invention provides a system and method for streaming media objects which improves the scalability, efficiency, and quality of service for delivery of streaming media. This is accomplished by providing a group of end nodes and at least one core node connected via an overlay network. The end nodes provide scalable storage for data caching and extra CPU power to reduce the load of the core node. The core node provides dedicated storage and reliable streaming services when the end nodes are not available.

In an embodiment of the present invention, the system keeps track of segment location information for segments of media objects cached in the system. The segment location information is stored in subsets of a distributed hash table on the end nodes in the system. To locate a segment of a media object the system first locates the end node that stores an index of the segment in the distributed hash table subset it maintains. The end node that stores the index selects a serving node where the segment is cached to stream the segment to the client. The serving node is selected among nodes in the location information based on load balance and/or other factors.

If a media object is requested for the first time in the system, the core node fetches the media object from a remote media server and caches the media object. The core node divides the media object into segments and creates segment indices for each segment. The segment indices are stored on end nodes in the system and include a location list of locations where the corresponding segment is cached. If a segment of a media object is not cached on any end node in the system, the core node fetches the segment, caches the segment, and acts as the serving node to stream the segment to a client. Accordingly, the core node acts as a backup to the end nodes to provide reliability to the system.

DETAILED DESCRIPTION

Figure 1:
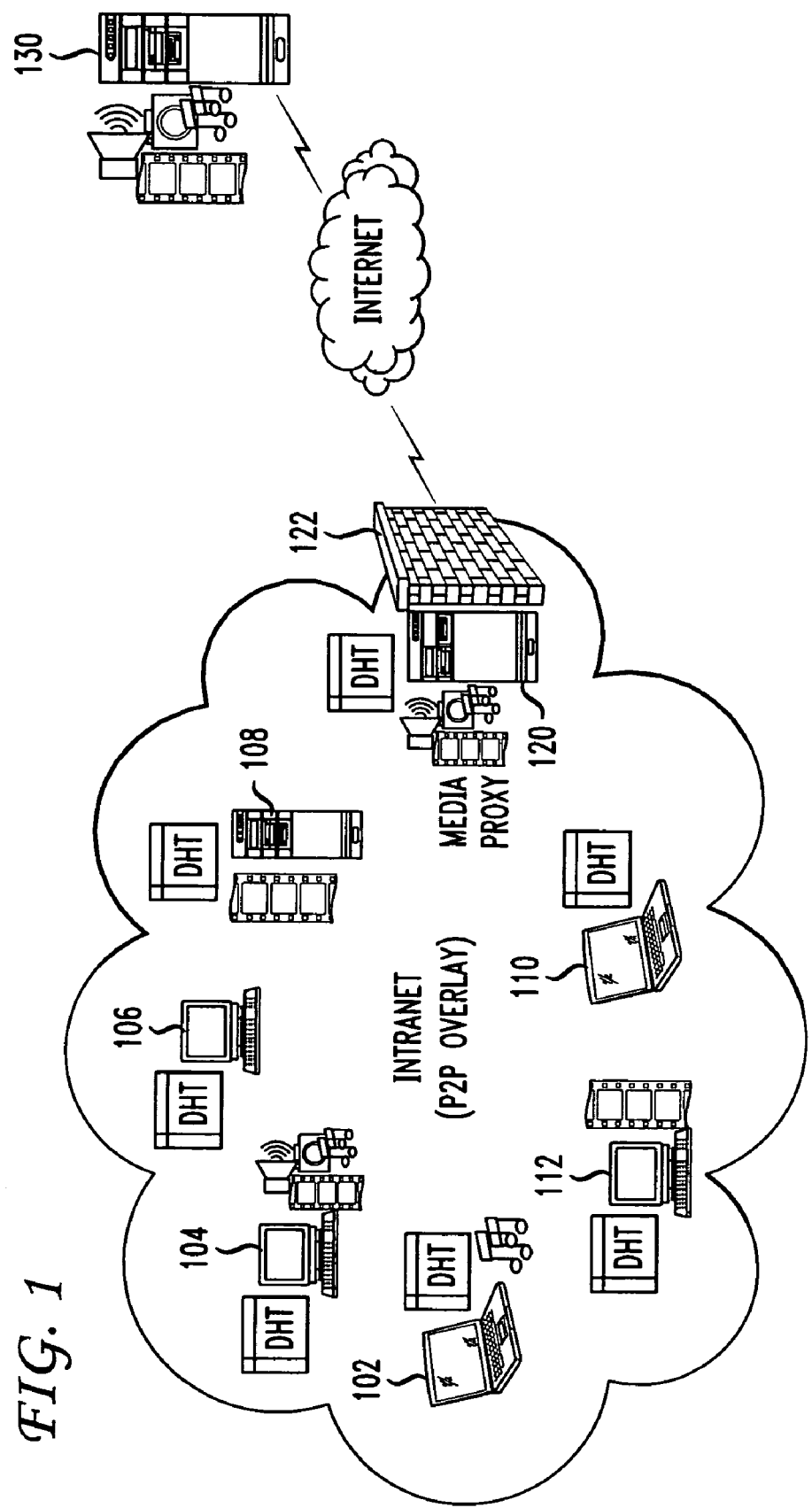
FIG. 1 illustrates a streaming proxy system according to an embodiment of the present invention.

FIG. 1 illustrates a streaming proxy system according to an embodiment of the present invention. As illustrated in FIG. 1, the streaming proxy system includes a group of end nodes 102, 104, 106, 108, 110, and 112 and at least one core node 120, which are all connected via a peer to peer (P2P) overlay network. A P2P overlay network is a network built on top of another network (i.e., the Internet). Each node in the P2P overlay network is connected by virtual or logical links, each of which corresponds to a path which may pass through multiple physical links in the underlying network. The end nodes 102, 104, 106, 108, 110, and 112 can be general purpose servers, end users, or the like. Moreover, the end nodes 102, 104, 106, 108, 110, and 112 can be clients which request media objects. Each end node 102, 104, 106, 108, 110, and 112 functions as a streaming server that provides media streaming service to clients by caching the media data in segments and sharing the cached data with other end nodes 102, 104, 106, 108, 110, and 112 in the system. The core node 120 is a dedicated proxy which acts as an interface between the group of end nodes 102, 104, 106, 108, 110, and 112 and at least one media server 130. The core node 120 communicates with the media server 130 via the Internet, and can be connected to the Internet through a firewall 122.

If a media object is requested by one of the end nodes 102, 104, 106, 108, 110, and 112 for the first time or no end node 102, 104, 106, 108, 110, or 112 in the system is able to serve a streaming request, the core node 120 fetches the requested media object from the media server 130, caches the media object locally at the core node 120, and divides the media object into smaller segments. In one embodiment, the core node 120 evenly divides the media object into the smaller segments. The core node creates a segment index for each segment of a media object, which is used to locate the segment in the system. Although the system of FIG. 1 is illustrated with one core node 120, the system may be provided with additional core nodes which work together to act as an interface between the group of end nodes 102, 104, 106, 108, 110, and 112 and the media server 130.

Each end node 102, 104, 106, 108, 110, and 112 also functions as an index server that maintains a subset of indices for locating media segments in the system. The media segments and the corresponding indices are decoupled, and may be maintained separately at different end nodes 102, 104, 106, 108, 110, and 112. The index of a media segment contains a location list of end nodes 102, 104, 106, 108, 110, and 112, each of which caches a copy of the media segment, and an access log for the segment, which includes the number of requests for the segment and a timestamp of each request. In order to locate a media segment, a request demanding the media segment is routed to the end node 102, 104, 106, 108, 110, or 112 at which the index of the media segment is stored, and an end node 102, 104, 106, 108, 110, or 112 that caches a copy of the media segment is selected based on the index of the media segment. The media segment is then streamed point-to-point from the selected end node 102, 104, 106, 108, 110, or 112 to the client which requested the segment. As described above, the client may be one of the end nodes 102, 104, 106, 108, 110, and 112 in the system.

In the streaming proxy system, each end node 102, 104, 106, 108, 110, and 112 is assigned a key space zone when joining the system and stores segment indices mapped to its respective key space zone. Accordingly, when the core node 120 segments the media object, each of the segment indices is mapped to a key space zone where it is stored by an end node 102, 104, 106, 108, 110, or 112 assigned to that key space zone. When an end node 102, 104, 106, 108, 110, or 112 joins the system, the end node 102, 104, 106, 108, 110, or 112 is assigned a key space zone and takes over the storage of corresponding segment indices from a neighboring end node 102, 104, 106, 108, 110, or 112. When an end node 102, 104, 106, 108, 110, or 112 exits the system, the segment indices stored thereon are transferred to a neighboring end node 102, 104, 106, 108, 110, or 112, and the key space zone of the exiting end node 102, 104, 106, 108, 110, or 112 is merged with that of the neighboring end node 102, 104, 106, 108, 110, or 112.

Each end node 102, 104, 106, 108, 110, and 112 includes a subset of a distributed hash table (DHT) for storing indices of media segments. The portion of the DHT of each end node 102, 104, 106, 108, 110, and 112 stores the indices of media segments in a (key, value) map, in which each key is an identifier of a media segment and the corresponding value is the index of the media segment. The identifier of a media segment can be a globally unique identifier (GUID) hashed from the URL of the media object and the particular segment of the media object. The identifier can be hashed from the URL using a hash operation known in the art, such as the Secure Hash Algorithm Version 1.0 (SHA1). The core node 120 can also have a subset of the DHT for storing indices of media segments.

Publish and unpublish operations can be performed on the DHT in each end node 102, 104, 106, 108, 110, and 112 in order to manage data stored in the DHT. A "publish(seg_id, location)" operation publishes a cached copy of a media segment (i.e., stores a location of the cached copy of the media segment in the distributed hash table), in which "seg_id" is the segment identifier and "location" is IP address and port number of the end node 110 which caches the media segment. Correspondingly, an "unpublish(seg_id, location)" operation unpublishes the copy of the media segment identified by "seg_id" and stored in "location." An end node 102, 104, 106, 108, 110, or 112 publishes a segment as soon as the segment is cached thereon, and unpublishes the media segment when the media segment is deleted. In order to publish or unpublished a media segment, an end node 102, 104, 106, 108, 110, or 112 routes its "location" and the "seg_id" of the media segment to a target end node 102, 104, 106, 108, 110, or 112 which maintains the segment index for the media segment. The target end node 102, 104, 106, 108, 110, or 112 then puts the "location" into the location list in the segment index (publish) or removes the "location" from the location list in the segment index (unpublish). Accordingly, the target end node 102, 104, 106, 108, 110, or 112 maintains consistency between media segments and corresponding media segment indices.

Figure 2:
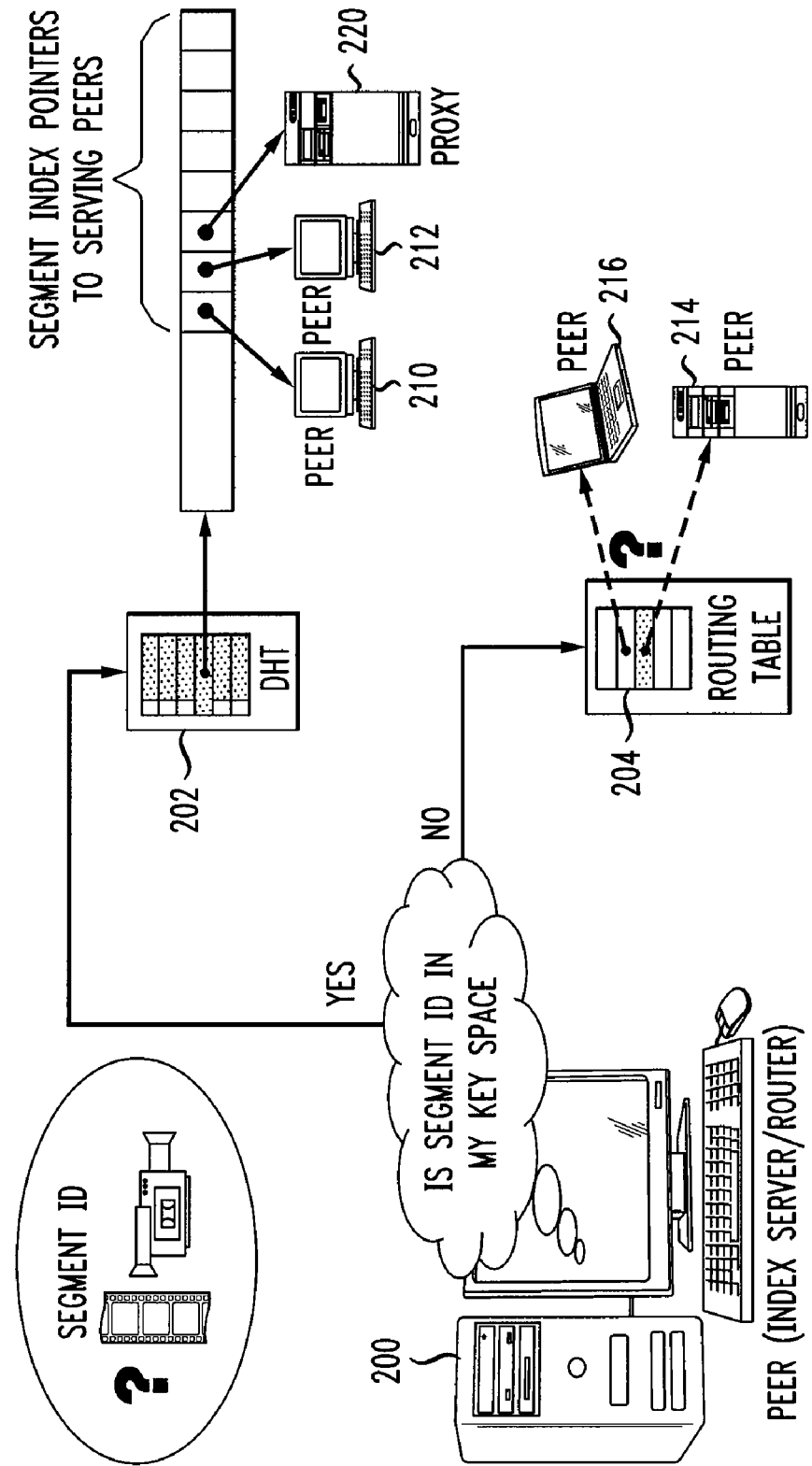
FIG. 2 illustrates data flow in an end node serving as an index server according to an embodiment of the present invention.

FIG. 2 illustrates data flow in an end node 200 functioning as an index server. The end node 200 has a distributed hash table subset 202 for storing the segment indices mapped to the key space zone of the end node 200. In response to a request for a media segment made by a user of the end node 200 or received from another end node, the end node 200 determines whether the request can be satisfied in the distributed hash table subset 202 stored on the end node 200. That is, the end node determines whether the segment identifier of the requested media segment is in the key space zone assigned to the end node 200. If the segment identifier is in the key space zone assigned to the end node 200, the end node 200 uses the segment identifier to search the distributed hash table subset 202 for a corresponding segment index. The segment index includes a location list containing locations of other nodes in the system which have cached the requested media segment. For example, in FIG. 2 location list contains locations of end nodes 210 and 212 which are peers of the end node 200 and core node 220. The end node 200 can then select a node from the list and use the selected node as the streaming server or return the selected node to the end node which requested the media segment to be used as a streaming server.

If the segment identifier is not in the key space zone assigned to the end node 200, the end node 200 routes the request to another end node. The end node 200 uses a routing table 204 to choose another end node 214 or 216 to route the request to based on the assigned key space zones of the other end nodes 214 and 216, so that the segment identifier of the requested media segment is in the assigned key space zone of the end node 214 or 216 that the request is routed to.

Figure 3:
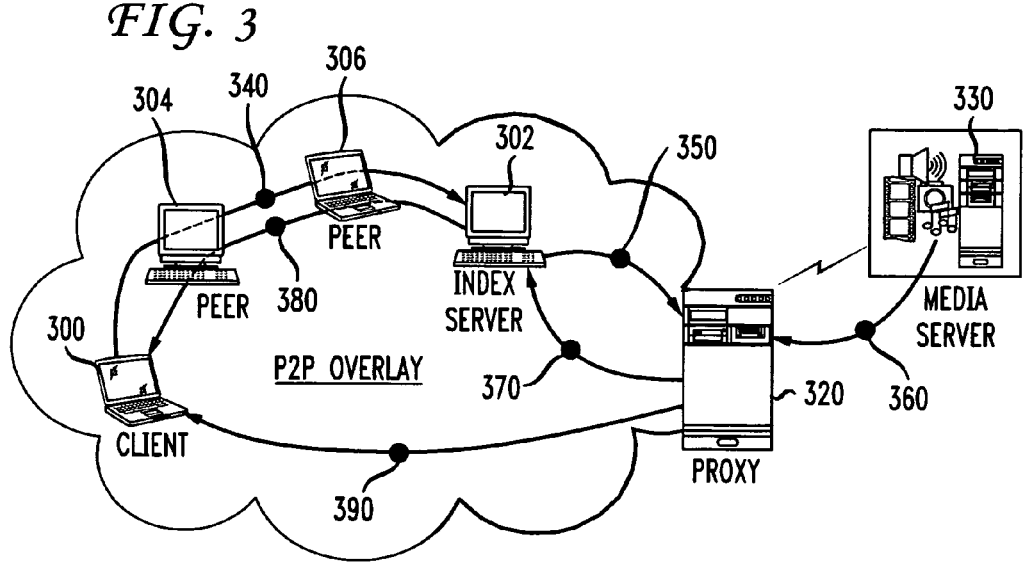
FIG. 3 illustrates processing a request for a media segment when the segment is not cached in the system.
Figure 4:
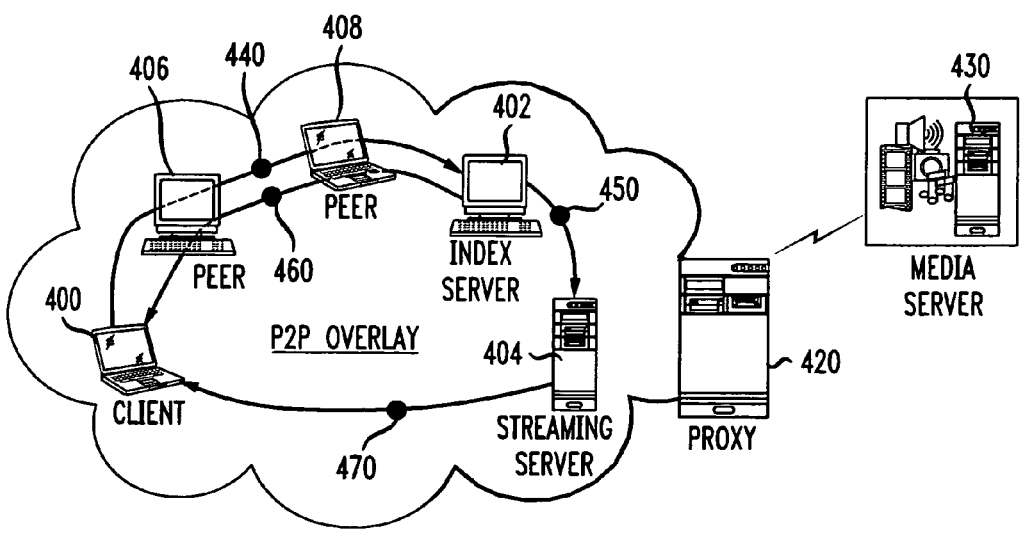
FIG. 4 illustrates processing a request for a media segment when the segment is cached in the system.

FIGS. 3 and 4 illustrate processing a media request in a streaming proxy system. FIG. 3 illustrates a case in which a media object is requested in the system for the first time or no cached copy of the media object is available in the system. As illustrated in FIG. 3, a group of end nodes 300, 302, 306, and 308 and a core node 320 are connected via a P2P overlay network. A requesting end node 300 acts as a client and requests a media object. The requesting end node 300 requests the media object segment by segment. The requesting end node 300 searches its local cache for the media object. If the media object is not locally cached on the requesting end node 300, the requesting end node uses a "request(seg_id, URL)" operation, which requests a segment of the media object designated by the URL. When the requesting node 300 requests a media object that is not locally cached, the requesting node 300 routes the request 340 to a target end node 302 which is assigned to the key space zone to which the identifier of the first segment of the requested media object is mapped. The target end node 302 functions as the index server responsible for storing the index of the first segment of the requested media object.

The target end node 302 searches the distributed hash table subset stored thereon for the index of the requested media segment. If the corresponding index does not exist, the object is requested for the first time. In this case, the target end node 302 sends a request 350 for the object to the core node 320. The core node 320 is a proxy between the end nodes 300, 302, 304, and 306 and a media server 330. The core node 320 fetches the requested object 360 from the media server 330, and creates the index and publishes the object, by sending the created index 370 to the target end node 302. The target end node 302 then returns the location of the core node 320 as the location of the media object 380 to the requesting end node 300. The core node 320 acts as a streaming server and delivers the media object 390 to the requesting node 300.

If the index of the requested media segment does exist when the target end node 302 searches the distributed hash table subset it maintains, but the location list in the segment index is empty, the requested media segment is not currently cached on any nodes on the system. In this case, the target end node 302 sends a request 350 to the core node 320 for the media segment. The core node fetches the requested media segment 360 from the media server 330, and publishes the location 370 of the media segment in the corresponding index on the target end node 302. The target end node 302 then returns the location of the core node 320 as the location of the requested media segment 380 to the requesting node 300, and the requesting node receives the media segment 390 from the core node 320. The requesting node 300 sequentially requests each of the segments of the requested media object.

FIG. 4 illustrates a case in which a requested media object is cached on at least one of the end nodes in the system. As illustrated in FIG. 4, a group of end nodes 400, 402, 404, 406, and 408 and a core node 420 are connected via a P2P overlay network. The core node 420 is a proxy which can act as an interface between the group of end nodes 400, 402, 404, 406, and 408 and a media server 430. A requesting end node 400 acts as a client and requests a media object. The requesting end node 400 requests the media object segment by segment. The requesting end node 400 searches its local cache for the media object. If the media object is not locally cached on the requesting end node 400, the requesting end node uses the "request(seg_id, URL)" operation to sequentially request the segments of the media object designated by the URL. The requesting node 400 routes a request 440 for the a segment of the media object to a target end node 402 which is assigned to the key space zone to which the identifier of the requested segment of the media object is mapped.

The target end node 402 searches the distributed hash table subset stored thereon for the index of the requested media segment. If the target end 402 node finds the corresponding index and the location list in the corresponding index is not empty, the requested segment is cached on at least one node in the system. In this case, the target end node 402 checks the validation 450 of a link to each of the nodes listed in the location list, and selects the node with the most available bandwidth to be a serving node 404. The target node returns the location 460 of the selected serving node 404 to the requesting end node 400. The serving node 404 acts as a streaming server and provides the requested segment 470 to the requesting node 400. The requesting node 404 can buffer the next segment when the current segment is played back. If the serving node 404 wants to exit the system before the streaming is terminated, the serving node 404 must transmit the rest of the segment to the requesting node 400 before exiting the system.

Figure 5:
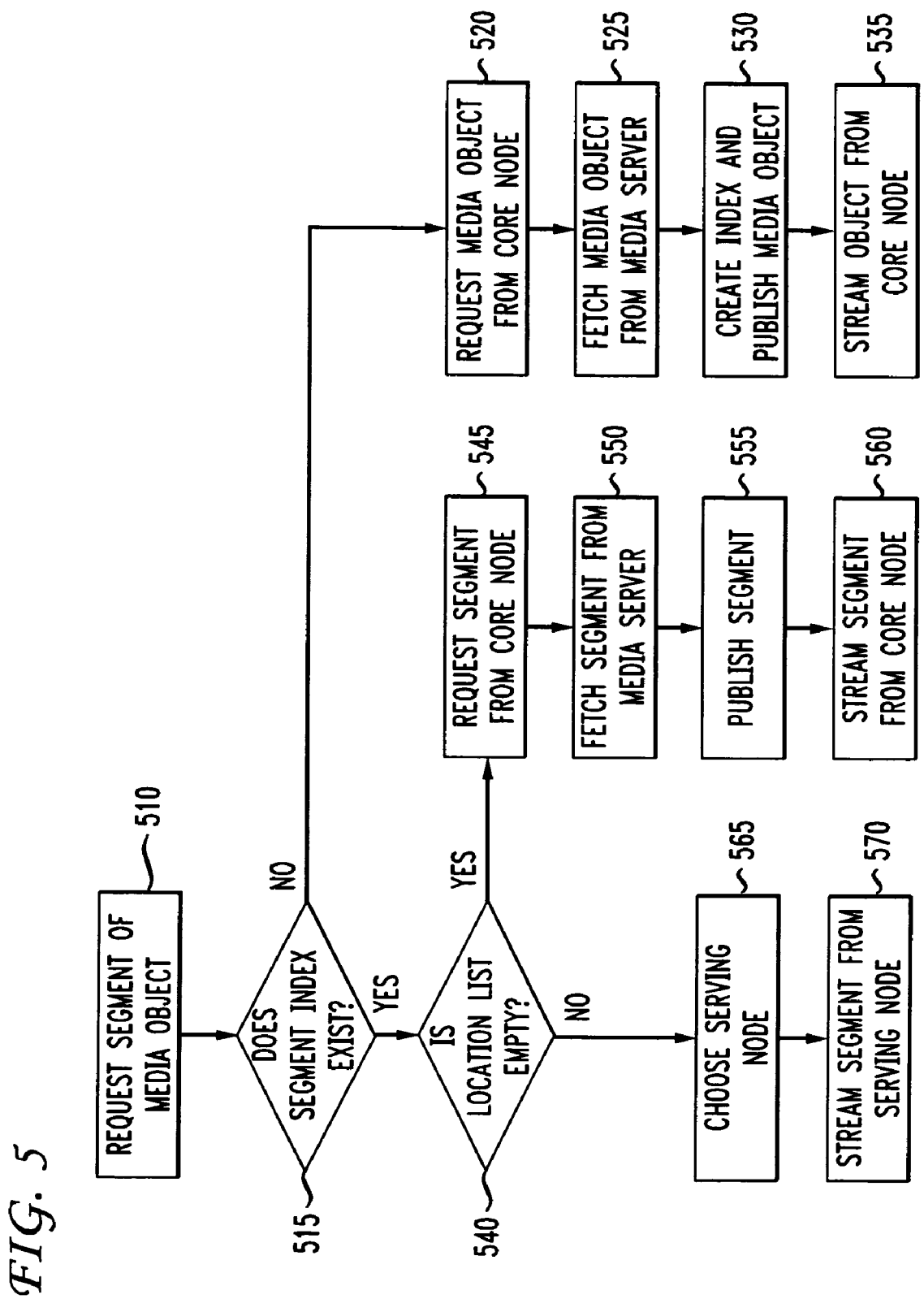
FIG. 5 illustrates a method of delivering streaming media according to an embodiment of the present invention.

FIG. 5 illustrates a method of delivering streaming media objects according to an embodiment of the present invention. At step 510, a requesting node requests a segment of a media object. In order for the requesting node to receive a streaming media object, the requesting node sequentially requests each segment of the media object. The requesting node uses a segment identifier of each segment to determine a corresponding key space zone, and sends the request to a target end node in the system assigned to the key space zone. The request specifies a URL of the media object and a segment identifier of the requested segment of the media object.

At step 515, the target end node determines whether a segment index of the requested segment exists on the target end node. The target end node uses the segment identifier of the requested segment to search a distributed hash table subset stored on the target end node for a segment index corresponding to the segment identifier. If the segment index does not exist on the target end node, the media object is being requested for the first time and the method proceeds to step 520.

At step 520, the target end node requests the media object from a core node in the system. Because the media object is being requested for the first time, the target end node requests the entire media object from the core node and supplies the core node with the URL of the media object. The core node is a proxy which can communicate with a media server via the Internet. At step 525, the core node fetches the requested media object from the media server using the URL of the media object. When the core node fetches the media object from the media server, the core node caches the media object and divides the media object into segments.

At step 530, the core node creates an index and publishes the media object. The core node creates a segment index for each segment of the media object and maps the segment indices to corresponding key space zones to be stored by end nodes assigned to the corresponding key space zones. The core node then publishes each segment to add the location of the core node to the segment index.

At step 535, the media object is streamed from the core node to the requesting node. When the core node published the requested segment of the media object, the target node returns the location of the core node to the requesting node. The core node then acts as a streaming server to stream the segment to the requesting node. For each subsequent requested segment, the requesting node will also receive the core node as the location of the segment, because all of the segments of the media object are cached at the core node.

Accordingly, the core node will stream each segment of the media object to the requesting node.

If the segment index of the requested segment does exist on the target end node at step 515, the method proceeds to step 540. At step 540, the target end node determines whether the location list in the segment index is empty. The segment index includes a list of nodes in the system that have cached a copy of the requested segment. If the location list in the segment index is empty, no nodes currently in the system have cached the requested segment, and the method proceeds to step 545.

At step 545, the target end node requests the segment from the core node. At step 550, the core node fetches the requested segment of the media object from the media server. When the core node fetches the requested segment, the core node caches the segment. At step 555, the core node publishes the copy of the segment stored cached thereon. The core node sends the location thereof to the target end node to be added to the list of locations in the segment index of the segment.

At step 560, the segment is streamed from the core node to the requesting node. When the core node publishes the copy of the segment cached thereon, the target end node returns the location of the core node to the requesting node. The core node then acts as a streaming server to stream the requested segment to the requesting node.

If the location list in the segment index of the requested segment is not empty at step 540, the method proceeds to step 565. At step 565, the target end node chooses a serving node. The target end node chooses one of the nodes listed in the location list of the segment index. The selection of a serving node can be optimized according to the capacities and workloads of the nodes that have cached the requested segment. Accordingly, the target end node can choose the node with the most available bandwidth to be the server node.

At step 570, the requested segment is streamed from the serving node to the requesting node. When the target end node chooses the serving node, the target end node sends the location of the serving node to the requesting node. The serving node then acts as a streaming server to stream the requested segment, which is cached on the serving node, to the requesting node. The requesting node sequentially requests each segment of a media file, and this method is repeated for each segment. The requesting node can buffer the next segment of a media object when a current segment is being played back.

Furthermore, the requesting node can cache a copy the segments of a media object when receiving the segments. The requesting node can then publish the copies of the segments cached thereon, by sending the location of the requesting node and the corresponding segment identifiers to target nodes storing corresponding segment indices thereon. The location of the requesting node is then added to the list of locations in the segment index of each segment. Accordingly, when another end node in the system requests the same media object, the requesting node can be selected as the serving node to stream the segments of the media object to the other end node.

Figure 6:
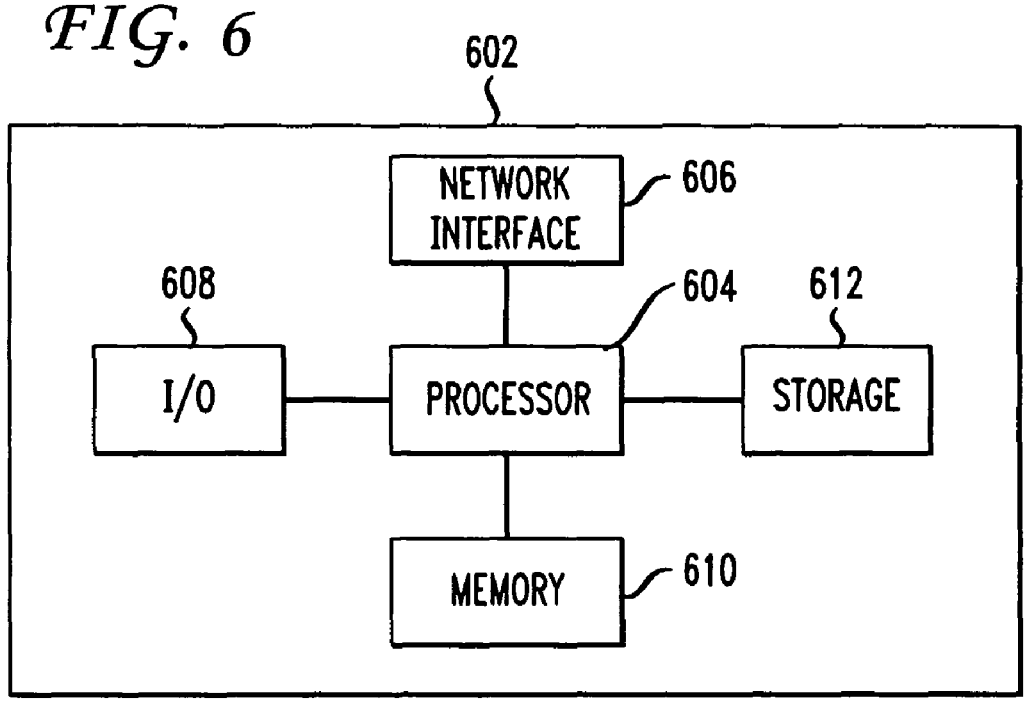
FIG. 6 illustrates a high level block diagram of a computer capable of implementing a method of streaming media objects according to an embodiment of the present invention.
Figure 7:
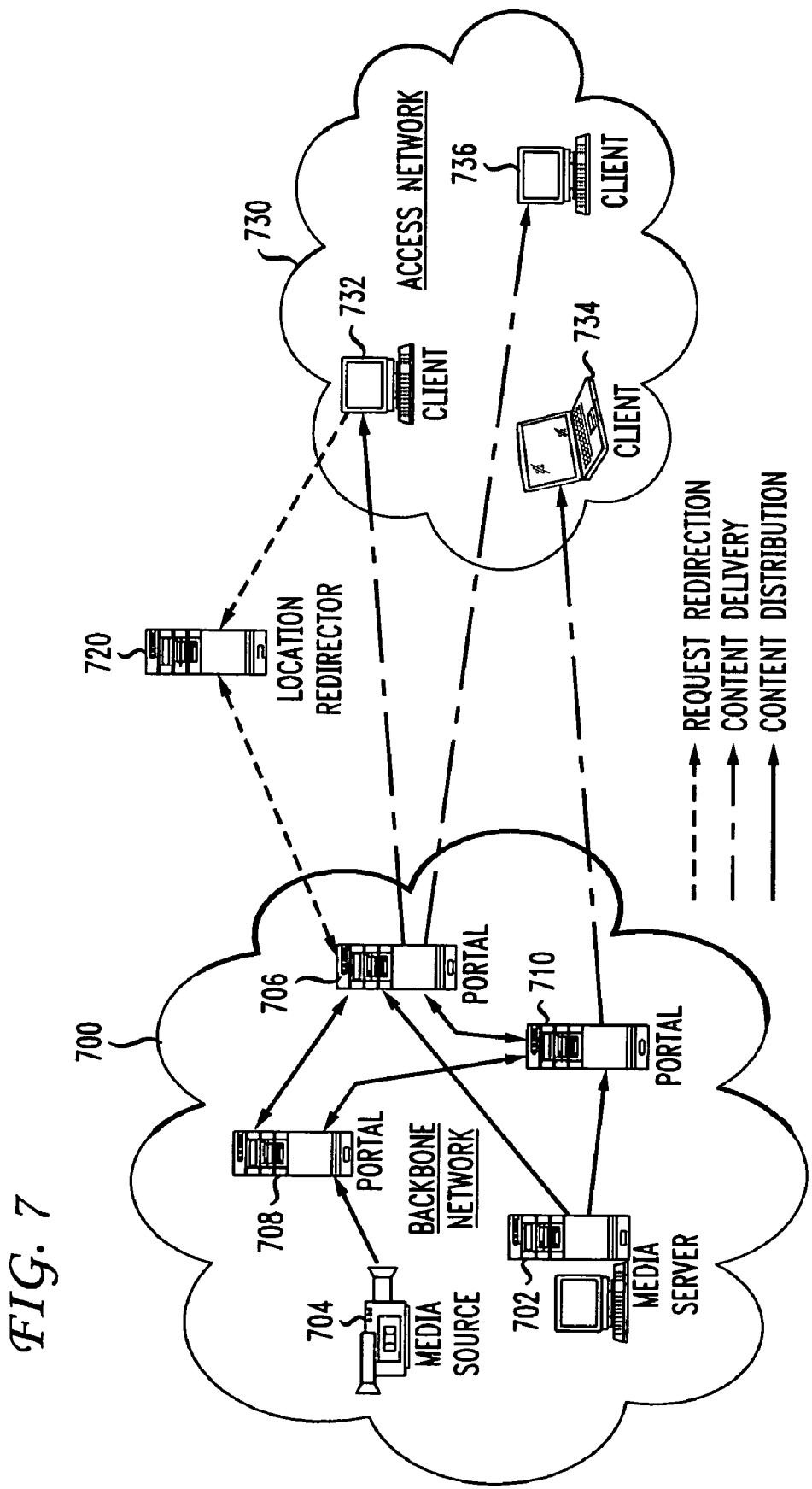
FIG. 7 illustrates a conventional content delivery network.

The above described method can be implemented as a computer program executed by a device which functions as a node in the system. For example, the method may be implemented on a computer using well known computer processors, memory units, storage devices, computer software, and other components. A high level block diagram of such a computer is illustrated in FIG. 6. Computer 602 contains a processor 604 which controls the overall operation of the computer 602 by executing computer program instructions which define such operation. The computer program instructions may be stored in a storage device 612 (e.g., magnetic disk) and loaded into memory 610 when execution of the computer program instructions is desired. Thus, the method of streaming media objects can be defined by the computer program instructions stored in the memory 610 and/or storage 612 and method will be controlled by the processor 604 executing the computer program instructions. The computer 602 also includes one or more network interfaces 606 for communicating with other devices via a network. The computer 602 also includes input/output 608 which represents devices which allow for user interaction with the computer 602 (e.g., display, keyboard, mouse, speakers, buttons, etc.). One skilled in the art will recognize that an implementation of an actual computer will contain other components as well, and that FIG. 6 is a high level representation of some of the components of such a computer for illustrative purposes.

As described above, in a streaming proxy system according to an embodiment of the present invention, a group of end nodes and at least one core node are connected via an overlay P2P network. The end nodes provide scalable storage for data caching and extra processing power to reduce the load of the core node, and the core node provides dedicated storage and reliable streaming services when the end nodes are not available or not able to do so. Accordingly, the system exploits resources available from the end nodes to provide scalability for the streaming system, and utilizes the core nodes as a backup service for system reliability.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of streaming a requested segment of a media object in a peer-to-peer network having a plurality of nodes including a plurality of end nodes and a core node, the method comprising:
   routing a request for the requested segment to a target end node assigned to a key space zone corresponding to the requested segment;
   if a segment index of the media object exists at the target end node:
      determining that the requested segment is not stored at any of the plurality of end nodes if a location list of the segment index is empty; and
      determining that the requested segment is stored at one of the plurality of end nodes if the location list is not empty;
   in response to determining that the requested segment is stored at one of the plurality of end nodes, streaming the requested segment of the media object from an end node of the plurality of end nodes at which the requested segment of the media object is stored;
   if the segment index does not exist at the target end node, determining that the requested segment is not stored at any of the plurality of end nodes; and
   in response to determining that the requested segment is not stored at any of the plurality of end nodes:
      retrieving the media object from a remote media server based on a uniform resource locator of the media object via the core node, determining, at the core node, a plurality of segments of the media object, wherein the plurality of segments includes the requested segment, storing the segment index at the core node, streaming the media object from the core node, and designating the core node as a streaming server for streaming all subsequent requests for the requested segment of the media object, wherein the remote media server is not in the peer-to-peer network and the core node is a dedicated proxy in the peer-to-peer network between the plurality of end nodes and the remote media server.

2. The method of claim 1, further comprising: connecting to the remote media server via the core node to fetch the media object; if the segment index does not exist at the target end node, creating a segment index for the requested segment and storing the segment index at the target end node assigned to a key space zone corresponding to a segment identifier of the requested segment; and if the segment index does exist at the target end node, storing location information of the core node in the location list of the segment index.

3. The method of claim 1, wherein a request for the requested segment originates from a client, the client being one of the plurality of end nodes.

4. The method of claim 3, further comprising: searching a local cache for the requested segment; if the requested segment is not in the local cache, routing a request for the requested segment based on a segment identifier of the requested segment and searching for the segment index corresponding to the segment identifier to determine whether the requested segment is stored at any of the plurality of end nodes and the core node based on the location list.

5. The method of claim 3, further comprising: storing the requested segment at the client when the requested segment is streamed to the client.

6. The method of claim 5, further comprising: publishing the requested segment stored at the client in a location list of the segment index.

7. The method of claim 1, wherein further comprising: publishing the requested segment stored at the core node in the location list of the segment index.

8. The method of claim 7, wherein publishing comprises: sending an internet protocol address and a port number of the core node to an end node to include the internet protocol address and the port number of the core node in the location list of the segment index.

9. The method of claim 1, wherein streaming comprises: selecting a node at which a segment has been stored to serve as a serving node; sending a location of the serving node to a client that requested the segment; and streaming the segment from the serving node to the client.

10. The method of claim 9, wherein selecting comprises: retrieving the segment index; and choosing an end node or the core node from a list of locations included in the segment index.

11. The method of claim 10, wherein choosing comprises: choosing the end node or the core node in the list of locations with most available bandwidth.

12. The method of claim 1, further comprising: playing a current segment of the media object when receiving the requested segment from the end node; and buffering a next segment of the media object when playing the current segment.

13. A streaming system, comprising:

a plurality of nodes in a peer-to-peer network, the plurality of nodes comprising:

a plurality of end nodes, each comprising:

a memory comprising:

segments of media objects and segment indices for locating segments of the media objects;

a subset of a distributed hash table for storing the segment indices having location information of the segments of media objects wherein each segment index comprises a location list which lists each end node or a core node at which a corresponding segment of the media objects is stored, wherein the location list comprises an internet protocol address and a port number for each end node or core node at which the corresponding segment of the media objects is stored; and segment indices of the segments having segment identifiers;

wherein each end node is assigned a key space zone and stores the segment indices of the segments having segment identifiers corresponding to the key space zone;

means for streaming requested segments of the media objects to a client;

means for searching the memory for a segment index corresponding to the requested segments of the media objects;

means for selecting an end node or the core node listed in the location list of corresponding segments to be used to stream the requested segments; and means for routing a location of the end node or the core node to the client; and a core node that is a dedicated proxy between the plurality of end nodes and a remote media server that is not in the peer-to-peer network, the core node comprising:

means for fetching the media objects from the remote media server based on a uniform resource locator of the media objects and storing the segment indices for locating the requested segments of the media objects when the requested segments are not stored at any of the plurality of end nodes, means for indicating that the core node is a streaming server for streaming all subsequent requests for the requested segments of the media objects, and means for streaming the media objects.

14. The streaming system of claim 13, wherein each end node further comprises: means for routing a request for a segment not stored at that end node to a target end node, which is an end node assigned to the key space zone corresponding to a segment identifier of the segment.

* * * * *